United States Patent [19]

Findley

[11] 4,150,409
[45] Apr. 17, 1979

[54] CHANNEL REPEAT ATTACHMENT

[76] Inventor: Roger Findley, Box 456, Spring, Tex. 77373

[21] Appl. No.: 870,724

[22] Filed: Jan. 19, 1978

[51] Int. Cl.$^2$ ............................................... G11B 21/08
[52] U.S. Cl. ......................................... 360/137; 360/78
[58] Field of Search ..................... 360/137, 60, 61, 74, 360/78

[56] References Cited

U.S. PATENT DOCUMENTS

| | | | |
|---|---|---|---|
| 3,645,540 | 2/1972 | Tanaka | 360/137 |
| 3,848,265 | 11/1974 | Biery | 360/60 |
| 3,950,786 | 4/1976 | Shapley | 360/60 |
| 4,041,537 | 8/1977 | Kishi | 360/60 |
| 4,044,386 | 8/1977 | Satou | 360/60 |

*Primary Examiner*—Jay P. Lucas
*Attorney, Agent, or Firm*—Browning, Bushman & Zamecki

[57] ABSTRACT

The invention comprises a channel repeat attachment for a tape unit of the type comprising a housing having an opening therethrough for receipt of the channel-change electrodes of a playback device, and a multi-channel tape mounted in the housing for movement past the opening, the tape having a channel-change key portion thereon. The attachment comprises a shield adapted to be disposed in an operative position in alignment with the opening and overlying the tape to separate the tape from the channel-change electrodes, and a connection portion adjoined to the shield for removably securing the attachment to the housing with the shield in its operative position.

11 Claims, 5 Drawing Figures

U.S. Patent  Apr. 17, 1979  4,150,409
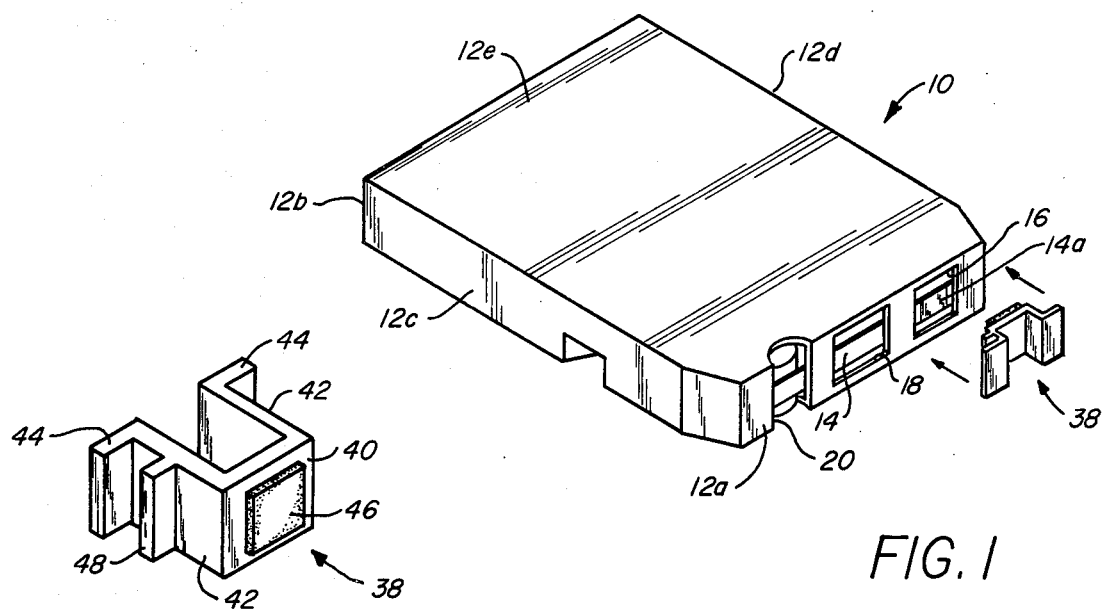
FIG. 1
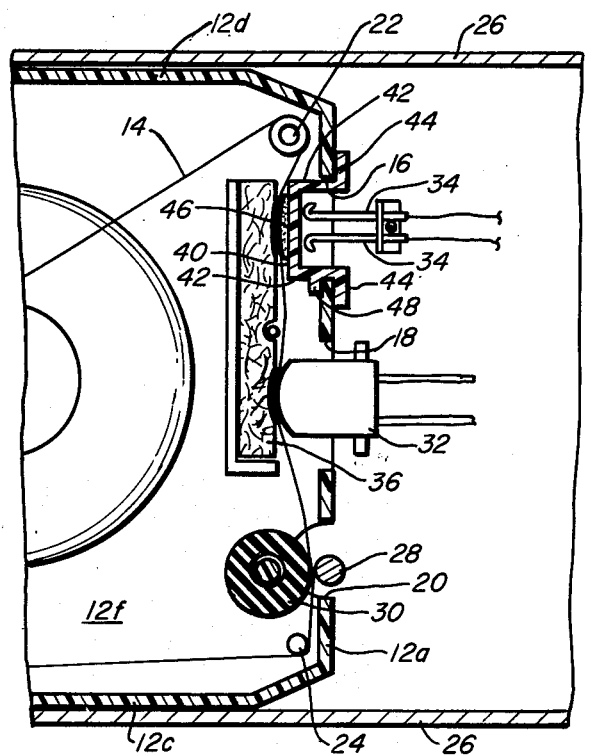
FIG. 2
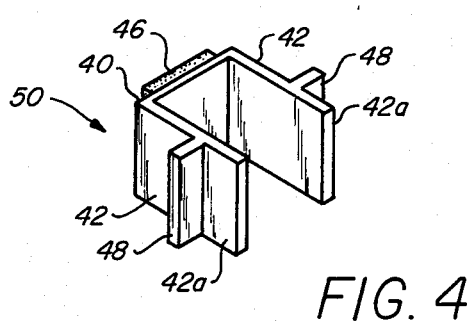
FIG. 3
FIG. 4
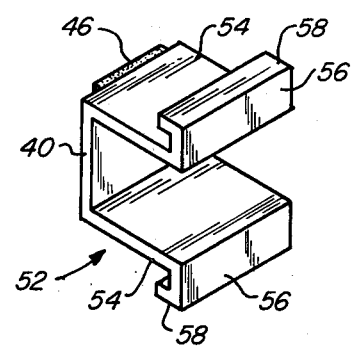
FIG. 5

CHANNEL REPEAT ATTACHMENT

BACKGROUND OF THE INVENTION

1. Field of the Invention

The present invention pertains to magnetic tape units such as cartridges and cassettes of the type having a multi-channel recording tape mounted within a housing. The housing typically has an opening therethrough for receipt of a pair of channel-change electrodes on the playback mechanism. The tape moves past the opening in use and has a channel-change key portion thereon, conventionally a small section of electrically conductive material. When the key portion comes into contact with the electrodes during use, it causes a short circuit which activates suitable means in the playback device to switch to a different channel on the tape. Thus, without interference, the playback device is designed to cooperate with the keyed tape to play back the various channels in succession.

In many instances, however, the user may desire to play one channel of the tape two or more times in succession without switching to the next channel.

2. Description of the Prior Art

At present, some types of playback devices are equipped with means to selectively cause one channel of a multi-channel tape to be played repeatedly. However, such means substantially increase the complexity, and therefore the cost, of the playback device. It is thus desirable to provide some means for accomplishing this function simply, inexpensively, and easily and, in particular, without the need for modification of either the tape unit itself or the playback device. In other words, there is a need for a convenient means of providing for a channel repeat function, which means may be used with standard tape units and with various types of playback mechanisms.

SUMMARY OF THE INVENTION

The present invention provides an attachment which may be easily secured to a standard tape unit such as a cartridge or cassette to cause one channel of the tape to be repeated over and over again when the tape unit is placed in the playback device. The attachment can be easily removed when it is desired to play another channel and can be subsequently re-attached any number of times. The attachment is inexpensive and may be used on any number of different tape units. Therefore it provides for a channel repeat function without the need for specialized tape units or playback devices and the consequent expense.

In its most basic form, the attachment comprises a shield portion adapted to be disposed in an operative position in alignment with the channel-change-electrode-receiving opening of the tape unit, overlying the tape to separate it from the electrodes. A connection portion is adjoined to the shield portion for removably securing the attachment to the housing of the tape unit with the shield portion in said operative position.

In accord with the conventional means of providing for channel changing, i.e. by providing a conductive key portion on the tape for contact with the electrodes, the shield may be comprised of an electrical insulating material such as plastic. However, the material could be varied to provide attachments for any tape unit and playback device which might operate on a different principal.

The connection portion of the attachment may take numerous forms, it being preferable that the connection portion and the attachment in general be configured so as to avoid interference with the proper functioning of the tape unit and playback device and catching or jamming in the playback device. Preferred forms of the invention also include a pad on the shield portion of the attachment for protective engagement with the tape, and this pad may be impregnated with a tape treatment medium such as a lubricant.

It is therefore a principal object of the present invention to provide a channel-change attachment for multi-channel tape units.

Another object of the invention is to provide an inexpensive means for providing for a channel-change function in standard tape units without modification of the tape unit per se or in the playback device.

Still another object of the invention is to provide a channel repeat attachment which includes tape treatment means.

Other objects, features, and advantages of the present invention will be made apparent by the following description of the preferred embodiments, the drawings and the claims.

BRIEF DESCRIPTION OF THE DRAWINGS

FIG. 1 is a perspective view of one embodiment of the invention in position for attachment to a tape unit.

FIG. 2 is an enlarged cross-sectional view of the attachment of FIG. 1 secured to the tape unit and also showing portions of the playback device engaged with the tape unit.

FIG. 3 is an enlarged perspective view of the attachment of FIGS. 1 and 2.

FIG. 4 is a perspective view of a second embodiment of attachment according to the invention.

FIG. 5 is a perspective view of a third embodiment of attachment according to the invention.

DESCRIPTION OF THE PREFERRED EMBODIMENTS

Referring now to the drawings, and particularly to FIGS. 1 and 2, there is shown a tape unit in the form of a conventional eight track tape cartridge including a housing 10 having a continuous loop of magnetic recording tape 14 mounted therein. Housing 10 includes end walls 12a and 12b, side walls 12c and 12d, and top and bottom face walls 12e and 12f. End wall 12a of the housing 12 has three openings, 16, 18 and 20 therethrough for receipt of appropriate parts of a playback mechanism partially diagrammatically illustrated in FIG. 2. The tape 14 passes around guides 22 and 24 within the housing 12 so that it is opposed to each of the openings 16, 18 and 20 and is mounted for movement past these openings in a manner well known in the art.

The playback device has a slideway defined by walls 26 for receipt of the cartridge 10. When the cartridge is properly positioned within the slideway, a drive roller 28 rotatably mounted within the playback device is received in the opening 20 and engages the tape 14 to urge it against an idler roller 30 rotatably mounted in the cartridge housing 12 so that the tape may be driven past the openings 16 and 18. Opening 18 receives a playback head 32 of the playback device which senses the sound recorded on the tape and transmits a corresponding signal, via suitable circuitry, to one or more speakers. The head 32 is designed to detect sounds on only one of the eight tracks or channels of the tape 14 at any given time.

Opening 16 receives a pair of channel-change electrodes 34. Tape 14 includes a channel-change key in the form of a small section of electrically conductive material 14a (see FIG. 1). During normal operation of the tape unit and playback device, the electrodes 34 will engage the tape 14 and urge it against a backing member 36 of soft resilient material, such as foam rubber. When the key 14a moves into alignment with the opening 16, head 32 will have reached the end of one of the tape channels. Key 14a will electrically connect the electrodes 34, thereby shorting out a circuit in the playback device. This triggers an adjustment of the playback device to cause the head 32 to begin detecting the next successive one of the eight channels of the tape 14.

The apparatus thus far described is well known in the art and has therefore been only briefly set forth to illustrate its relation to the attachment of the present invention.

One embodiment of attachment according to the invention is shown in FIGS. 1-3 and generally indicated by the numeral 38. Attachment 38 comprises a generally planar shield 40 sized to pass through opening 16 and cover the key 14a. In its position, shown in FIG. 2, the shield 40 is disposed within housing 12 in alignment with opening 16 and overlying tape 14. A pair of generally planar parallel spacer elements 42 integral with shield 40 extend perpendicularly from opposite edges of the shield so that, with the shield in operative position, spacer elements 42 extend out through opening 16.

The attachment further comprises a pair of gripping flanges 44 each extending laterally outwardly from the edge of a respective one of the spacer elements 42 distal the shield 40. Thus, with the attachment in operative position, flanges 44 will overlie respective portions of the end wall 12a of the cartridge housing 10 on opposite sides of opening 16. The spacer elements 42 serve to offset the shield 40 from and connect it to the flanges 44. A pad 46, to be described more fully below, is mounted on the opposite side of shield 40 from spacer elements 42. As best seen in FIG. 2, the spacer elements 42 are sized so that when flanges 44 are engaging the outer surface of wall 12a, pad 46 will be in engagement with the tape 14 and will be urging the tape 14 against the backing member 36. With the parts in these positions, a tab 48, which extends laterally outwardly from one of the elements 42 intermediate the respective flange 44 and the shield 40, is disposed adjacent the inner surface of the wall 12a adjacent one side of the opening 16.

The resiliency of member 36 and/or the fact that electrodes 34 may be resiliently mounted on springs or the like (not shown) make possible the accommodation of the attachment in the operative position. As shown in FIG. 2, the dimensions have been somewhat exaggerated for purposes of illustration, but it should be understood that, in practice, the various positions of the attachment are thin and its dimensions from the shield 40 to the flanges 44 is relatively small so that it can easily fit between the tape unit and the playback device.

Flanges 44 and tab 48 serve as the connection portion of the attachment 38 and serve to removably secure the attachment to the cartridge housing 12 with the shield 40 in the operative position shown in FIG. 2. The flanges 44 also serve as a gripping portion of the attachment, accessible from the exterior of the cartridge 10, whereby the attachment may be grasped for emplacement and removal.

Portions 40, 42, 44 and 48 of the attachment are integrally formed of a semi-rigid plastic or other suitable material. Such material is sufficiently flexible to allow the tab 48 to snap past the wall 12a at the edge of opening 16 and/or to allow the spacer elements 42 to be flexed toward each other by grasping the flanges 44 thereby permitting attachment and removal of the attachment 38 from the cartridge 10.

Because the shield 40 is formed of electrical insulating material and is interposed between the tape 14 and electrodes 34, it will not be possible for the key 14a to contact the electrodes 34 and trigger the channel-change function of the playback device as long as the attachment 38 is in place, and a desired channel may be played any number of times. When it is desired to change channels, the attachment is simply removed.

The pad 46 is formed of felt or other suitable material for engaging the tape 14 and protecting it from damage from the shield 40. If desired, pad 46 may be impregnated with a tape treatment medium, such as a lubricant.

Referring now to FIG. 4 there is shown a second embodiment of attachment according to the present invention indicated generally by the numeral 50. Attachment 50 includes a shield 40, spacer elements 42 and a pad 46 substantially identical to the like-numbered elements of attachment 38. However, attachment 50 differs from attachment 38 in that it has two tabs 48, each extending laterally outwardly from a respective one of the spacer elements 42. In use, the tension of tape 14 in engagement with attachment 50 will tend to urge it out of the opening 16, such movement being resisted by the tabs 48 engaging the inner surface of wall 12a on opposite sides of opening 16, tabs 48 thus serving as the connection portion of the attachment 50. Attachment 50 also differs from attachment 38 in that the gripping portion thereof is formed by extensions 42a of the spacer elements 42. Thus extensions 42a serve as a pair of gripping flanges which are disposed transverse to the shield 40, rather than parallel thereto as are the flanges 44, and which, in use, will project slightly outwardly from the opening 16.

Referring now to FIG. 5, there is shown a third embodiment of attachment indicated generally by the reference numeral 52. Attachment 52 has a shield 40 and pad 46 substantially identical to the like numbered part of the preceding emodiments. However, attachment 52 differs from the other embodiments in that its spacer elements 54 are disposed to extend along the top and bottom edges of opening 16 rather than along the side edges. An L-shaped clip is integrally formed at the outer edge of each spacer element 54. Each clip has one leg 56 disposed to extend along end wall 12a of the housing 10 of the tape unit toward a respective one of the face walls 12e and 12f, and another leg 58 disposed to extend along the respective face wall 12e or 12f a short distance. Clips 56, 58 serve as both the connection portion and gripping flanges of the attachment 52.

It can readily be seen that the various embodiments of the invention described above provide a channel-repeat attachment which is simple and inexpensive to manufacture and to use. It may be used with standard tape units and playback devices without any specialization or modification of the latter. A single attachment may be used any number of times and may be used on many different tape units. Furthermore, the attachment will not only not damage the tape or other apparatus, but as explained above in connection with the pads 46, may even be used to treat the tape.

It will also be appreciated that numerous modifications of the preferred embodiments may be made without departing from the spirit of the invention. Thus, by way of example but not of limitation, the configuration of the shield portion could be changed, e.g. it could be a perforated screen rather than a solid member or any other type of member operative to effectively insulate or separate the tape from the channel-change electrodes. In this connection, it is noted that it is not necessary for the shield to actually contact the tape, but only to overlie the tape and separate it from the electrodes. The connection and gripping portions of the attachment could also be altered, it only being necessary that they provide means for removably securing the attachment to the tape unit without danger of their becoming caught in or interfering with the playback device. Also, while the invention has been illustrated as applied to an eight track tape unit, it could be adapted for use with cassettes, or virtually any other type of tape unit.

It is thus intended that the scope of the invention be limited only by the claims which follow.

I claim:

1. A channel repeat attachment for a tape unit of the type comprising a housing having an opening therethrough for receipt of channel-change electrode means of a playback device, and a multi-channel tape mounted in said housing for movement past said opening and having a channel-change key portion thereon, said attachment comprising:
   a shield portion adapted to be disposed in an operative position in alignment with said opening and overlying said tape to separate said tape from said electrode means;
   and a connection portion adjoined to said shield portion for removably securing said attachment to said housing with said shield portion in said operative position.

2. The attachment of claim 1 wherein said connection portion includes tab means positioned to be disposed within said housing adjacent the interior of the wall of said housing adjacent said opening.

3. The attachment of claim 1 wherein said connection portion includes clip means engageable with the exterior of said housing.

4. The attachment of claim 1 wherein said shield portion is adapted to be disposed within said housing in said operative position, said attachment further comprising a gripping portion offset with respect to said shield portion and spacer means interconnecting said gripping portion and said shield portion whereby said gripping portion is positioned to be accessible from the exterior of said housing when said shield portion is in said operative position.

5. The attachment of claim 4 wherein said gripping portion includes a pair of spaced apart gripping flanges, and wherein said spacer means includes a pair of spaced apart spacer elements connecting respective ones of said flanges to said shield portion.

6. The attachment of claim 5 wherein said connection portion includes a tab element extending laterally outwardly from at least one of said spacer elements between said shield portion and said respective gripping flange and positioned to be disposed within said housing adjacent the interior of the wall of said housing adjacent said opening, and wherein said spacer elements are flexibly movable toward each other.

7. The attachment of claim 5 wherein said flanges extend laterally outwardly from said spacer elements generally parallel to said shield portion to overlie the exterior of said housing.

8. The attachment of claim 5 wherein said flanges extend generally transverse to said shield portion.

9. The attachment of claim 1 wherein said shield is comprised of electrical insulating material.

10. The attachment of claim 1 further comprising pad means on said shield means engageable with said tape.

11. The attachment of claim 10 wherein said pad means is impregnated with a tape treatment medium.

* * * * *